(12) United States Patent
Gong

(10) Patent No.: US 8,032,493 B2
(45) Date of Patent: Oct. 4, 2011

(54) SYSTEM AND METHOD OF OBTAINING INTERRELATED DATA IN A DATABASE

(75) Inventor: Yu Gong, Half Moon Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 426 days.

(21) Appl. No.: 12/239,034

(22) Filed: Sep. 26, 2008

(65) Prior Publication Data

US 2009/0198729 A1 Aug. 6, 2009

Related U.S. Application Data

(60) Provisional application No. 61/025,244, filed on Jan. 31, 2008.

(51) Int. Cl.
*G06F 7/00* (2006.01)
(52) U.S. Cl. .......................... 707/661; 707/694
(58) Field of Classification Search .................. 707/661, 707/665, 667, 668, 673, 953, 694
See application file for complete search history.

(56) References Cited

U.S. PATENT DOCUMENTS

| 7,870,174 B2* | 1/2011 | Eadon et al. ................. 707/953 |
| 2006/0101095 A1* | 5/2006 | Episale et al. ............... 707/204 |
| 2007/0103984 A1* | 5/2007 | Kavuri et al. ........... 365/185.17 |
| 2009/0100089 A1* | 4/2009 | Eadon et al. ................. 707/102 |

* cited by examiner

*Primary Examiner* — Hung T Vy

(57) ABSTRACT

A system and method are provided for obtaining interrelated data for a database. The method can include the operation of calculating a data row set for a driving table in the database using at least one archive policy. A further operation is obtaining explicit and implicit application relationships between a second level table and the driving table. The driving table can be linked to the second level table to identify data rows eligible for archiving in the second level table. In addition, partition identifiers can be copied from the driving table rows to the second level table data rows in order to enable merging of application partitions as needed. Additional data rows can be found in the driving table based on the application relationship between the second level table and the driving table. The data rows collected from the tables can be archived.

23 Claims, 6 Drawing Sheets

SYSTEM AND METHOD OF OBTAINING INTERRELATED DATA IN A DATABASE

CROSS REFERENCE TO RELATED APPLICATIONS

This Application claims the benefit of provisional patent application Ser. No. 61/025,244, filed Jan. 31, 2008, titled "System And Method Of Obtaining Interrelated Data In A Database", which application is incorporated by reference herein as if reproduced in full below.

BACKGROUND

Enterprise Resource Planning (ERP) software, Customer Relations Management (CRM) Software, and custom software applications support businesses operations and provide a wealth of business information. While processing transactions and collecting more customer data is valuable for a business, unmanaged data growth can slow application performance, strain financial and technical resources and jeopardize completing business-critical processes on time.

In order to avoid the negative impact of unmanaged growth in very large databases, many software solutions exist to provide archiving capabilities for databases. Archiving software enables users to segregate historical data from current data and store it securely and cost-effectively.

By reducing the amount of information in a production database, less disk space is used for application data and this can cut storage costs. As a result of archiving, there can be less information to search through and applications execute and process data faster. When databases run more efficiently, then organizations derive the most business value from mission-critical applications.

Simply archiving data that is explicitly referenced between tables in a database may not be enough when there are extensive data relationships defined by database applications, such as ERP software. One challenge in managing the archiving of inactive but important data is ensuring that all the relevant data is archived together. Achieving the goal of archiving relevant data together helps ensure that interrelated data is not separated to different storage tiers, and having complete archive data makes it possible to restore interrelated data together. Without this completeness of archived data, the archived data that is restored for use by the application may be missing, which results in corrupt and potentially unusable data. There is also the possibility that database applications can unknowingly produce incorrect results using incomplete data retrieved from the archive.

Given a set of driving rows from a table, finding all the interrelated data in the database is a huge challenge. For database applications, this problem is further compounded by the fact that data relationships are not represented completely by the explicit relationships defined in the database tables. Oftentimes, the database applications determine how data is implicitly interrelated.

DETAILED DESCRIPTION

Figure 1:
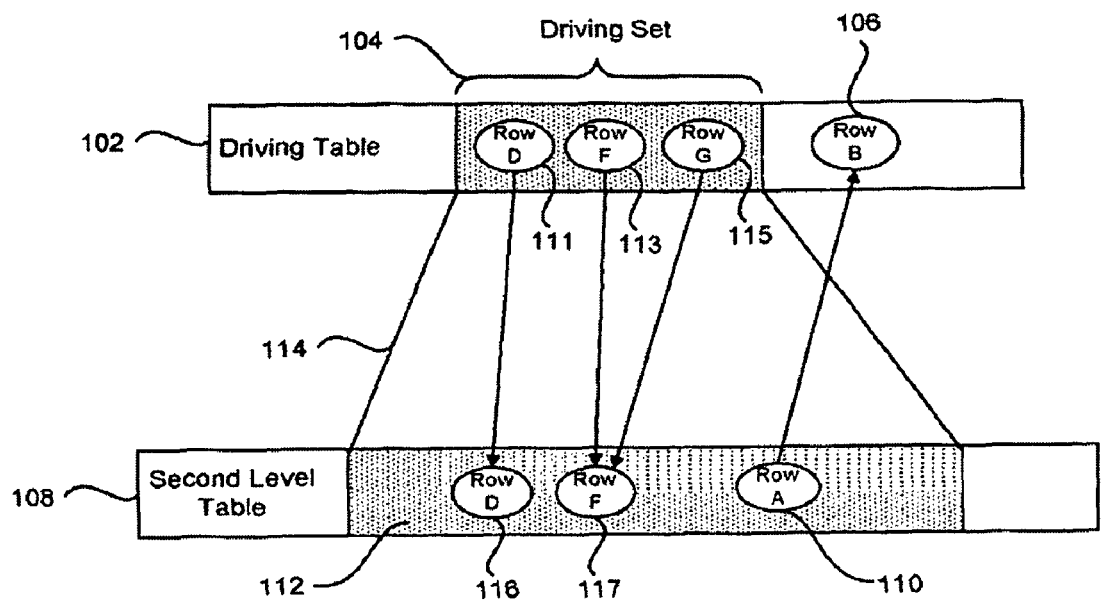
FIG. 1 is a block diagram of a driving table and second level table in accordance with an embodiment.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

A system and method are disclosed herein for a database archiving system and software. An active archiving solution can relocate closed transactions in primary database applications to archive media to significantly improve application performance, preserve historical records for legal discovery, maintain regulatory compliance, follow corporate governance initiatives, and reduce costs.

Business database applications have two logical layers in which the logic for the data is contained. One logical layer is defined explicitly in storage data structures such as the database tables and the referential relationships among the tables. The other layer is processing logic that is embedded into application programs written in a certain programming language that is configured to access the database. However, it can be difficult and sometimes impossible, for a database archiving program to access these application relationships because those relationships are not explicitly accessible.

Since neither the static database structure nor the dynamic program can separately reflect all the business relationships in the overall data, both the static data structures and the embedded application processing logic can be combined together in the present system and method in order to deduce all the business-level relationships used for archiving. The static data structure information and the application process logic can be combined together to identify data that is considered to be a "business partition" for archivable data. Data that is archived using the recognition of business partitioning has the benefit of maintaining the data integrity for business applications and this validity is important in applications such as data subsetting, data masking, and data archiving.

Prior to the creation of the concept of "business partitioning", most commercial database management systems provided "data partitioning" mechanisms. But data partitioning is not directly useable for database archiving, due to its lack of knowledge about the dynamic and implicit application logic. Accordingly, it is the business partitioning that is important to the data integrity in the archiving of database applications.

In one embodiment, a system and method are provided for obtaining interrelated business data for a database on a computer platform. An exemplary method is illustrated in FIG. 3 and the operations and elements of the method that will be described are also illustrated using FIGS. 1 and 2.

Figure 2:
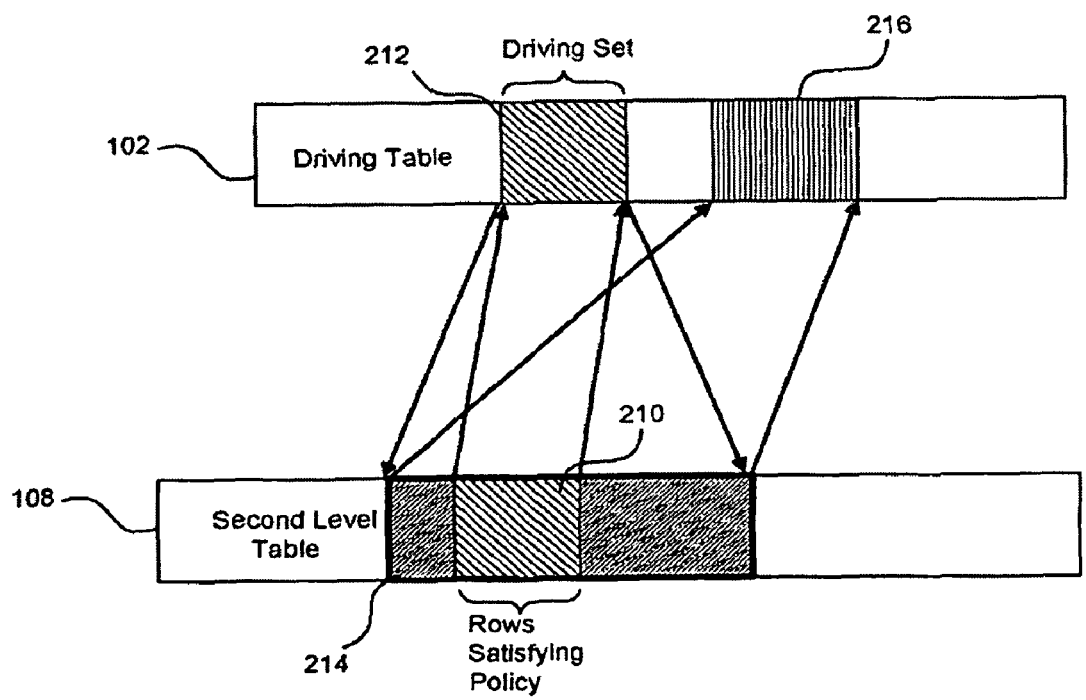
FIG. 2 is a block diagram of a driving table and second level table of FIG. 1 with an implicit data row reference from the second level table to the driving table.
Figure 3:
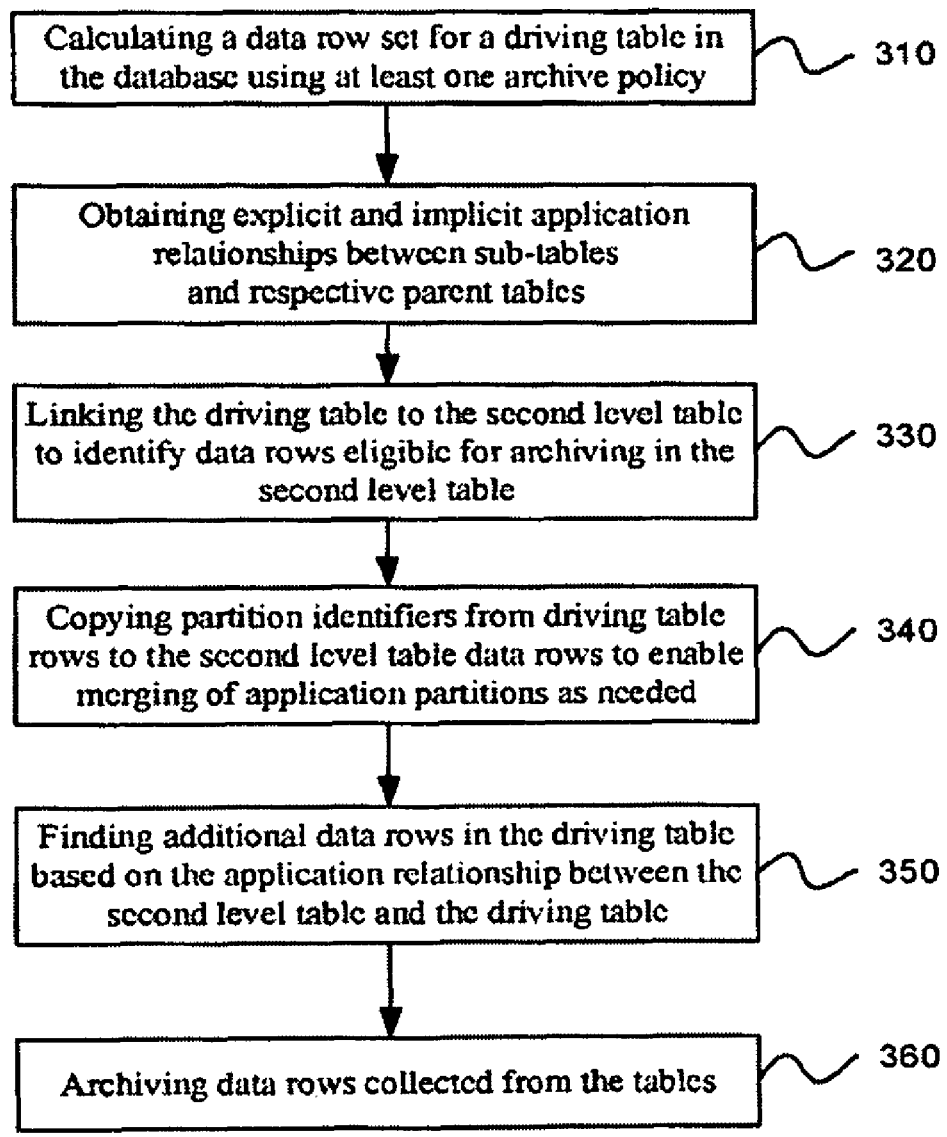
FIG. 3 is a flow chart illustrating a method of obtaining interrelated business data for a database.

The method can include the operation of calculating a data row set or "driving set" for a driving table using one or more archive policies, as in block 310 of FIG. 3. The policy is provided by business management personnel who have determined which data is desired to be archived based on their judgment of the business operation's needs. For example, a business manager may decide that all the data that is more than four years old is seldom needed for daily operation and the data meeting this criterion can be archived. FIG. 1 illustrates that a driving set 104 or a driving data row set can be found for a driving table 102. The driving set is a listing of data rows in the table which meet the defined business criteria, but these data rows do not necessarily need to be contiguous. As will be explained later with FIG. 2, a driving table may not necessarily be a "policy table" on which a policy is defined.

Each eligible row in the driving set can be assigned a unique application partition ID (APID). The intention is for each driving row to find out all the rows in its business partition. On the driving table, without information about how the data interacts, we can only assume all the driving rows are in different business partitions. This is why each driving row is assigned a unique APID. Later in the discovery process, we may find that two application partitions are one and the same and at that time the two partitions are merged. At a later point in the discovery process, we may find that one of the rows in a business partition is ineligible for archive, at that time the entire business partition is disqualified. The merging and disqualification of business partitions go on at each parent-child table pairing or "level" when the system traverses the application relationship graph starting from the driving table.

During the traversal of the application relationship graph, all of the interrelated rows will inherit the same unique application partition ID (APID) from parent tables. After the discovery ends, all the rows in multiple tables with the same APID constitute one application partition and can be archived together. During the traversal, application partitions can be merged (if two application partitions are found to share the same row) or disqualified (if any member in the partition is found to violate an application archive eligibility rule). An eligibility rule is a condition imposed on a table that archived rows must satisfy. For example, if a customer status is "ACTIVE", the row for this customer cannot be archived since the row is currently being used. Restrictions like this are dictated by technical issues, rather than business operational concerns. These are called "eligibility rules." The purely business operational archive requirements are called "policies."

Some prior art systems have referred to APID as the application transaction ID (ATID) or application transaction type ID (ATTID). While all of these labels largely define the idea of grouping data, only the present system and method is able to calculate the complete closures of related data rows. Thus, this method can perform partitioning of data according to application logic, while the prior art systems cannot. Each application partition includes a complete business transaction. The APID is used to ID each business partition.

In addition to having one or more archive policies, explicit and implicit application relationships can be obtained between the second level table and the driving table, as in block 320 (FIG. 3). The explicit relationship is a relationship between tables provided by the database, normally in the form of referential relationships. The implicit application relationship is a relationship that is not explicitly defined by the tables and the relationships defined in the database between the tables. An example of an explicitly defined relationship is a field in one table that is explicitly used to join to another table. In contrast, an implicit application relationship is a relationship that is defined programmatically by the application coded to operate on the defined database. For example, if the application creates rows that point to a table where no explicit database linkage is provided, then this hidden relationship is an implicit application relationship. A more detailed example of an implicit application relationship will be provided later.

This system and method covers both explicit and implicit types of relationships. Accordingly, any use of the phrases "application relationship", "relationship", and "data relationship" in this disclosure cover both types of relationships, if not explicitly expressed otherwise.

In order to start the process of finding the desired rows for archiving, the driving table is linked to the second level table to identify eligible rows in the second level table (i.e., child table), as in block 330 (FIG. 3). In SQL (Structured Query Language) terminology this operation is typically performed by a join operation. While a relational database may be used with this method, other types of databases may be used such as object-oriented databases and flat files. In addition, any child rows in a second level table that have received an APID from a parent row may be disqualified if the child data rows do not meet the policy constraints.

Note that there may be multiple relationships between the two tables. In such cases, each relationship is separately processed in a join operation. Any row in the child table (e.g., second level table) that is connected to an eligible row in parent table (e.g., driving table) through at least one relationship is marked as also being eligible. If a child row 116 in FIG. 1 is connected to only one eligible parent row 111, the same APID assigned to the parent row is applied to the child row.

If a child row 117, as illustrated in FIG. 1, is connected to multiple parent rows having different APIDs 113 and 115, this means multiple application partitions that were previously considered as being different partitions are actually one and the same. In such cases, the minimum of the parent APIDs is calculated, and the calculated APID is assigned to the child row 117 and all the connected parent rows 113 and 115. This step is illustrated in block 340.

Once an initial set of data rows is found, then additional data rows can be found in the driving table based on the application relationship between the second level table and the driving table, as in block 350 (FIG. 3). This is illustrated in FIG. 1 where row A 110 results in row B 106. As shown in FIG. 1, row B was not initially selected from the driving table as being eligible. But after row A in the child table (or second level table) is selected as being eligible, then row B is also eligible because row A is linked to row B.

If additional rows (like row B in FIG. 1) are found in the driving table as a result of the reverse traversal of the application relationship, then the driving table is linked or joined to the secondary table again (using the newly discovered rows such as row B in FIG. 1) to see if additional rows are found in the secondary table. In other words, the present method can loop repeatedly through the finding steps described until no additional rows are found in the second level table and driving table.

An example of this is illustrated in FIG. 2. In this example, an archive policy is specified on table 108, which happens to be a second level table. In other words, the archive policy can be specified on any table. A first operation results in obtaining a data row set for the driving table according to the policy. This is called a driving set 212 as illustrated in FIG. 2. The driving set is obtained by calculating the set of rows 210 in table 108 that satisfy the archive policy. Then the application relationships are used to find the driving set 212. The driving set is then joined with second level table to find more eligible rows, as illustrated by 214. Since the updated set of rows 214 in the second level table is larger than the first row set in the driving table 210, the second level table can join back to the driving table 108 to find additional eligible rows 216 that have not been discovered yet. As soon as the set of additional eligible rows 216 is found, and if the set is not empty, the new rows become part of a new driving set that includes the original driving set. This process can continue until all of the chained rows are found. In practice, this process can occur for multiple rows that are being worked on.

The process described above with respect to FIGS. 1-3 can also be applied to a tree of tables of any depth. This simplified case has just been provided to conceptually illustrate the method. In more complex cases, the driving table and second level table can be located at any point in the tree. In other words, the driving table is not necessarily at the root of a tree of tables, but the driving table is a role assumed by a parent table for a child table as the chaining moves through a tree of tables.

Finally, all of the data rows that have been collected from the tables using the chaining operations and the implicit application relationships can be archived to the database, as in block 360 (FIG. 3). The database archiving software stores aged transactions that need to be kept for compliance and other reasons. Data can be stored as complete transactions on platform independent, lower cost storage. An example of one archive format may be an XML format which provides an open standards archive that is accessible even when the source application is no longer available.

In one embodiment, the identified data grouped in the same business partition can be provided with a "partition identifier", and this identifier allows the data archive partitions to be manipulated as business data partitions (as opposed to previously used table partitions). This allows the data belonging to the same business partition to remain together and to be archived together too. Any time the archived data is needed in the future to run a report then all the related data is readily available.

Because of the chaining that has occurred, this archive data is "encapsulated" with as much related reference metadata as possible, so that archived business transactions can be accessed by an XML query after the source application has been retired. Users can later move the historical records from a short term archive to a permanent archive, where data may be stored in XML format along with XML Schema Definitions (XSD), or users may move data directly from production environments to the long term archive. The archived records are configured to be as completely independent of the application, platform, database or operating system as is reasonably possible.

As mentioned, the short term archive can store transactions that are seldom used but the transactions are desired to be readily and transparently available to applications. Short term archive application transparency may be retained by providing online, real-time user access to a combined view of production and archived data through the existing application reporting interfaces. Once inactive data is identified, the short term archive can segregate the inactive data from the active data. Because the inactive data has been identified and segregated, the rows in high-volume transactional tables are reduced, and this can improve transaction performance for the active data. Inactive data may be relocated to long term archives in a relationally intact form by moving data either to different tables within the production database or to a separate database on less expensive storage media.

As described previously, the system and method can include obtaining an implicit application relationship. One way this implicit application relationship can be obtained is by having a system administrator describe a known hidden relationship between a sub-table and a driving table. The implicit application relationship can be described using a graphical user interface (GUI) drawing tool that enables the system administrator to draw the hidden relationship onto an already existing ER (entity-relationship) diagram. The implicit relationship can be graphically displayed using a differently illustrated linkage than the explicitly defined table links. For example, a link representing the implicit application relationship can be dotted, red colored or otherwise emphasized for the benefit of the system administrator. Both the explicit and implicit application relationship are used for finding the chaining relationships when archiving takes place. Alternatively, the implicit application relationships can be described using a text format or another useful format that is not graphical.

Figure 7:
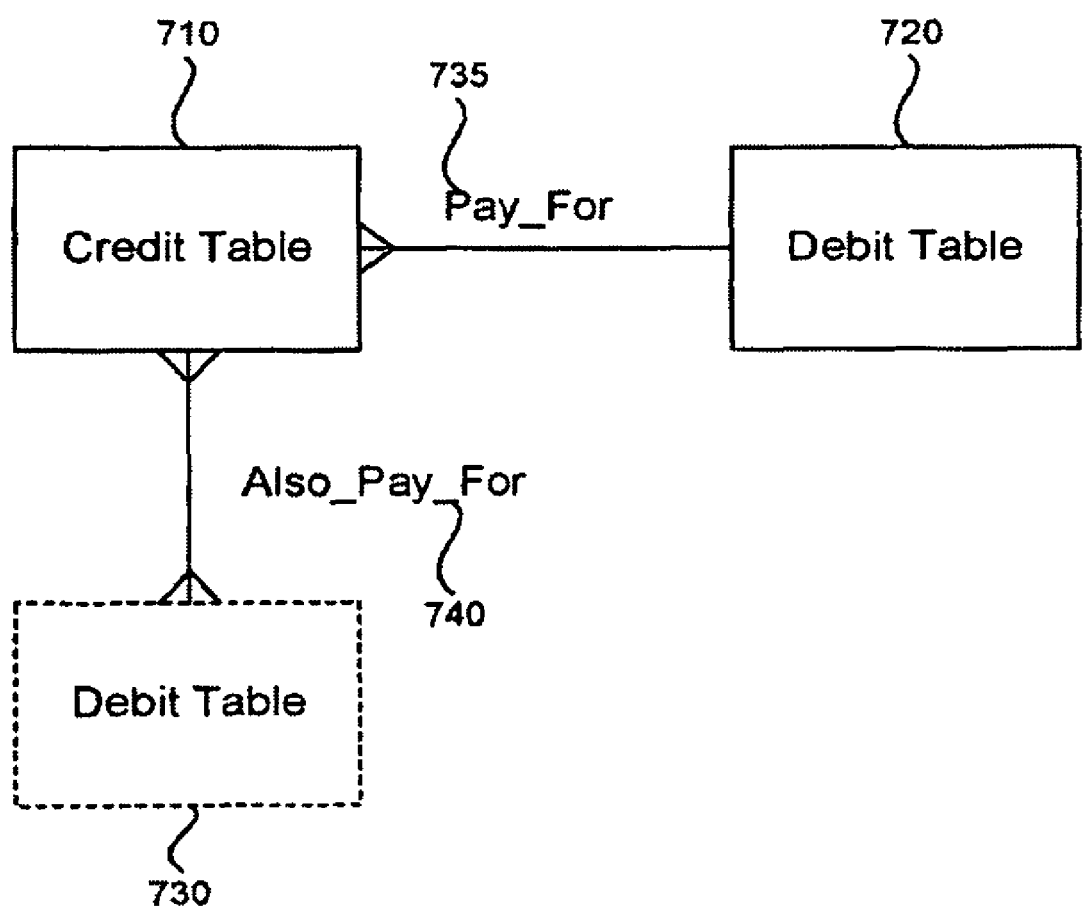
FIG. 7 is a block diagram illustrating an implicit application relationship between two tables.

A more specific example of an implicit application relationship will now be described. FIG. 7 illustrates a simple database business application that tracks debits and credits. For simplicity, this example has only two tables. Each credit in the credit table 710 is explicitly defined as referring to only one debit in the debit table 720. Since each credit is defined as referring to one debit, the application designer has created a database level referential constraint named Pay_For 735 from the credit table to the debit table.

However, in reality a credit may be applied to more than one debit. So the company has created a rule and application that allows the credit to fill any other pending debit, and an entry is also made in the credit table about which other debits the credit paid for.

In addition to the explicit Pay_For relationship, the additional rule has created a hidden relationship between the credit and debit table. This implicit relationship is called the Also Pay_For relationship 740. The relationship Pay_For is a many-to-one relationship between the credit and debit tables, but the hidden Also_Pay_For relationship is a many-to-many relationship. In this situation, a well-trained database schema designer would believe that it is a mistake to implicitly add the Also_Pay_For relationship by using application programs.

When it comes to archiving the data, using the visible Pay_For relationship is insufficient, because all the debits in the Also_Pay_For list will be missing. Suppose a system administrator is asked to archive anything related to credit ID C_1020. If the system administrator is not knowledgeable about the specific behavior of the business application, the system administrator is likely to only archive data partially, which will miss all the Also_Pay_For debits. Disaster may occur unexpectedly in the future when the data reloaded into another system or is reloaded years later because the application data is incorrect and portions of the implicitly chained data are missing.

In order to ensure the application's integrity for this example, all the Also_Pay_For debits must be archived together with credit C_1020. Suppose debit IDs D_101 and D_153, are on the Also_Pay_For list. If D_101 and D_153 are archived, the system should also archive any credits that point to these two debits because the system desires to maintain the business application's integrity. If D_101 and D_153 are archived, then what about their own Also_Pay_For list? The system can also include these additional relationships too. This type of chaining process may proceed on until a complete transitive enclosure is achieved. This transitive closure is what is called a "business partition" which includes all the chained data that is interrelated together. This allows the entire business partition to be manipulated as a unit.

In an alternative embodiment, an implicit application relationship can be obtained by examining implicit application relationship with software code that uses artificial intelligence. In other words, the archival software can search through electronic locations where rules defining implicit application relationships are known to be stored. For example, an implicit application relationship between a second level table and a driving table can be obtained by automatically inspecting business rules located in a middleware software layer associated with the database. The middleware layer may be located on a different server then the main database. As long as the software is configured to interpret the meaning of the middleware rules then these rules may be used to find descriptions of implicit relationships that are not defined in the database.

Implicit database rules can also be located in the application itself and if these hidden relationships are well defined and accessible to the archival software, then such implicit application relationships can also be used in the archival process. For example, a Java applet may be reverse engineered or reverse interpreted to determine what hidden linkage is created or a trigger can be interpreted for the same reason. Another location of implication application relationships may be found by automatically inspecting triggers or business rules associated with the database that do not provide an explicit linkage between tables.

The eligibility of data is another factor that determines whether or not specific rows are actually archived or not. One reason for eligibility constraints is to ensure that active data is not removed from the database Examples of some eligibility constraint rules that may be checked for include rows that are marked in the database as being "open" or "active." The eligibility constraints can check for this type of data and then data rows that do not pass the eligibility constraints will not be archived.

In a similar way, the eligibility constraints can be driven by the archive policy. Assuming that the archive policy has been set to archive only transactions more than four years old, then certain data rows may fall outside this criterion. FIG. 1 can conceptually illustrate this situation, where row A is identified for archiving and is within the archive policy. However, row B appears to fall outside of the archive policy. These eligibility constraints can either be strictly enforced or weakly enforced. If eligibility constraints are being weakly enforced, then row B may not be archived but row A will be archived. When the eligibility constraints are being strongly enforced, then row B will not be archived and the archival of row A may be rolled-back too.

The eligibility constraints may also be applied at a table level and then a system administrator can turn the eligibility constraints on or off at the table level of granularity. For example, a table may have a local table constraint that any data less than a year old may not be archived. As another example, Table Z may have the constraint that any row that joins with a row from Table Z may not be archived. This functionality is valuable in protecting the integrity of application data, and avoids the situation where data may be using a categorization table but then the data is broken when all or a portion of the categorization table is archived.

As discussed, due to the acceleration of data growth in large database systems it is valuable to relocate closed transactions and other infrequently accessed data to an easily accessible online archive database. This significantly reduces the size of the production system and can dramatically improve application performance.

Other valuable results of archiving data in a complete and encapsulated manner include the ability relocate inactive business transactions to an online archive database on less expensive storage computing systems. In addition, when archival data is retained in short term archives then application transparency is provided along with online, real-time user access to a combined view of the production and archived data through native application and reporting interfaces. The inactive data can be identified using business rules, activity history and retention policies.

Using an encapsulating archive system can boost application performance by as much as 70 percent, improve application availability, stability, and cut information technology infrastructure costs. In addition, a combination view into the production database and archival databases can retain transparent, online real-time access to both the production and archive data.

Figure 4:
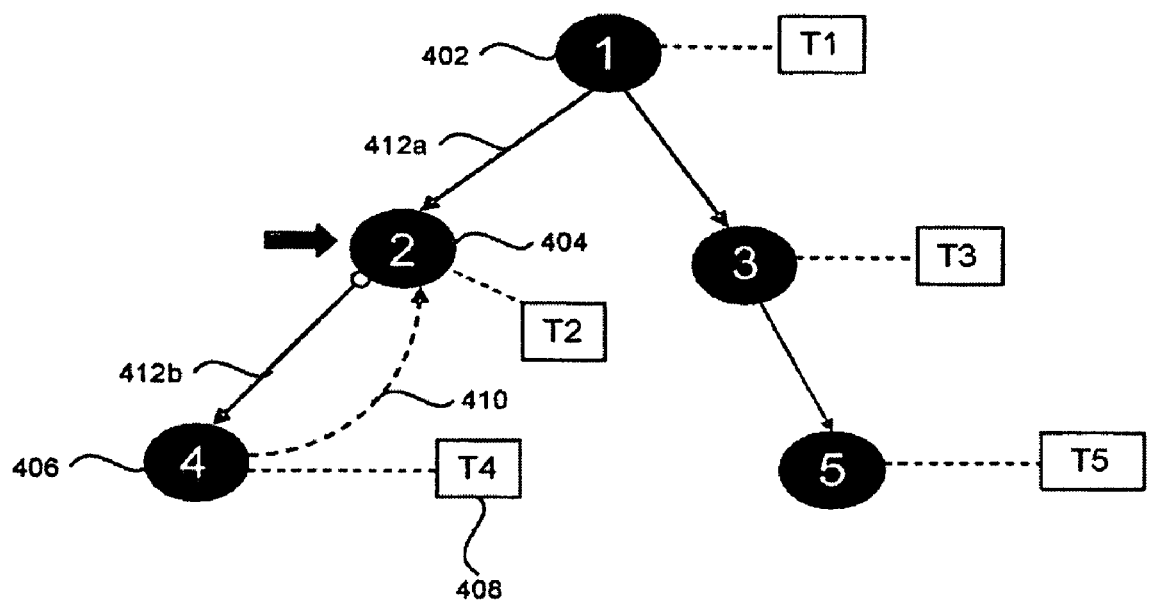
FIG. 4 is a diagram illustrating nodes and related tables that can be used in obtaining chained data using an implicit application relationship.

FIG. 4 illustrates a tree of table nodes. A tree depth of three nodes is depicted here for simplicity but a tree of any depth or complexity can be used. In this example, a data row set is calculated for a driving table 402 in the database using an archive policy. However, the policy range is first applied to a sub-table 404 which in turns calculates the data row set for the driving table. This illustrates that the policy range or business archive policy can be applied to any table in a tree but then the root node and table becomes the driving table.

When going from a driving row to the second level table, a row in the second level table is selected. This second level row may or may not cause new rows to be selected in driving table. FIG. 1 shows that row 110 causes new row 106 to be selected in driving table. In the same figure, row 116 and row 117 do not cause new rows to be selected in the driving table. If as the result of selecting rows in second level table, new eligible rows are selected in the driving table, this means there is a "feedback" (or "echo") relationship from the second level table to the driving table.

The implicit feedback relationship 410 between sub-tables and respective parent tables is also obtained as illustrated in FIG. 4. Then the sub-tables are joined directly and indirectly to the driving table 412 a-b using the calculated data row set until a leaf node table is reached.

Next, the system can find additional data rows using the feedback relationships 410 between each sub-table and parent table, and the additional data rows are added to the data row set to be archived. If new data rows are found in the sub-tables linked to parent tables then this may result in new data rows in the driving table.

When new rows are found for the driving table then the system will drive through the tables again. In other words, the archival software will link (i.e., join) down the tree through tables using the implicit application relationship and explicit relationships. Once no new rows are identified in the driving table, then the process of finding rows stops. Finally, the archival software can archive the data collected from the tables, as described previously.

Figure 5:
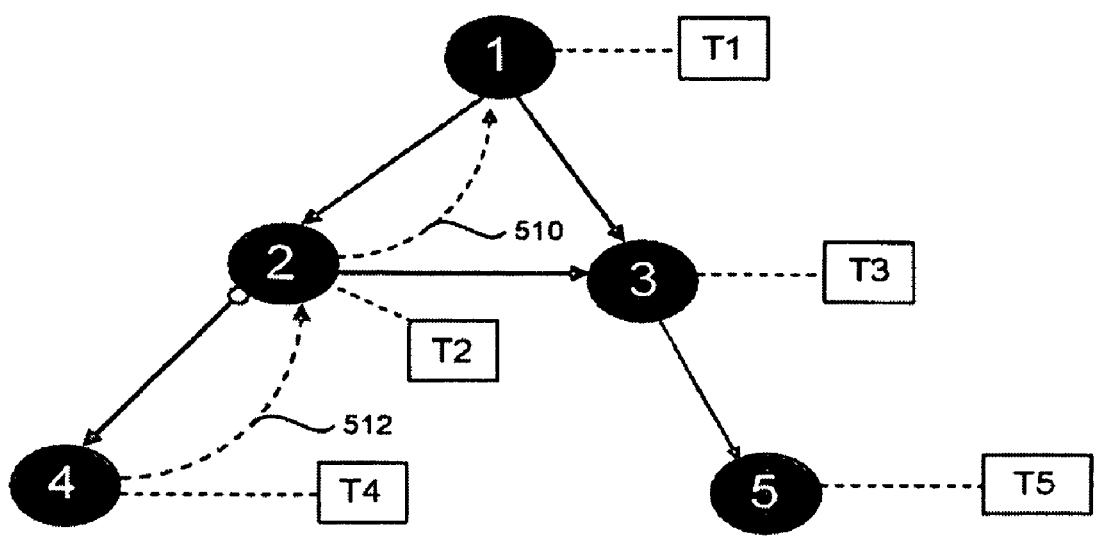
FIG. 5 is a diagram illustrating nodes and related tables that can be used in obtaining chained data using more than one implicit application relationship.

FIG. 5 illustrates a tree of table nodes that has multiple feedback relationships 510 and 512. When the traversal up the tree takes place, then additional rows may be found for each parent and sub-table pair in the implicit feedback relationship. The system and method disclosed here provide a system that can identify chained relationships in a database using both application relationships and the feedback relationships without requiring any custom programming on the part of the system administrator or other end user. The feedback relationships may be automatically discovered by the method based on cardinalities of the applications' relationships.

Figure 6:
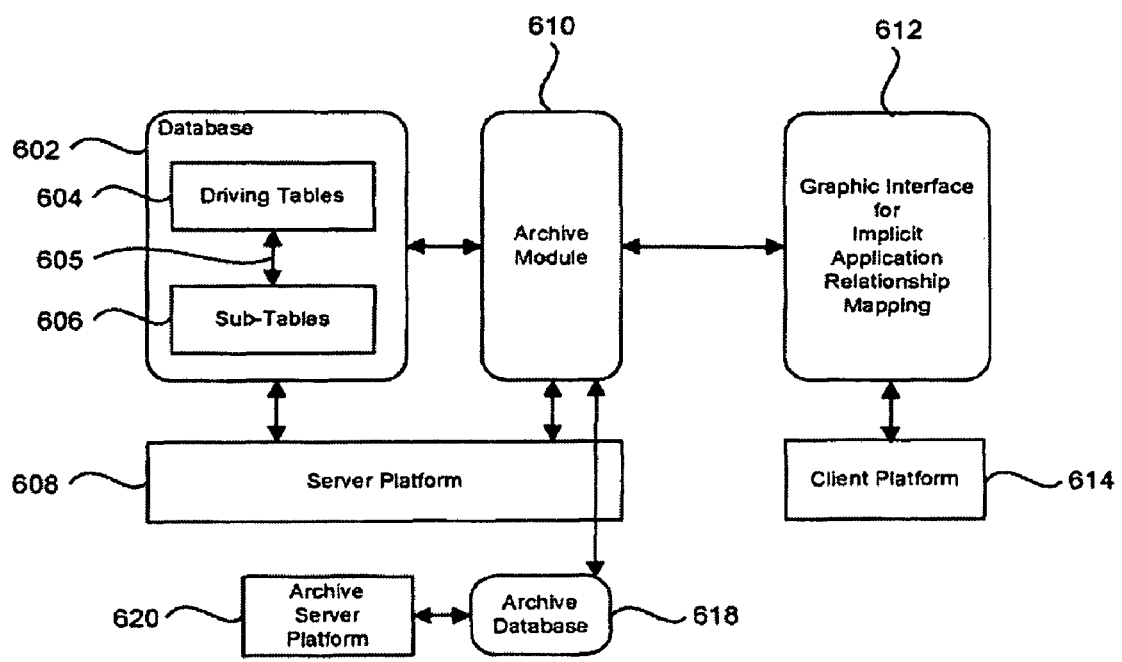
FIG. 6 is a block diagram illustrating a system for obtaining interrelated business data for a database.

A system is illustrated in FIG. 6 for obtaining interrelated business data for a database executing on a computer platform. The system includes a plurality of tables in the database 602, including driving tables 604 and sub-tables 606. The database also has explicit and implicit relationships defined between the tables 605.

A graphical database interface 612 can be configured to obtain an implicit application relationship that defines or describes implicit relationships between the sub-tables and their respective parent tables. The explicit relationship, on the other hand, can readily be obtained from the database itself. However, the user may instruct the system to ignore any explicit relationship if the data stored in a certain table brings only unimportant data to the relationship. The graphical database interface can be executing on a client platform 614 or alternatively on the database server 608, if desired. Typically, the user interface for the system administrator is able to provide commands to the database. The system administrator can describe or draw the implicit relationships between the tables and these implicit relationships can be used in later archive processing.

An archive module 610 can be configured to calculate a data row set for a driving table in the database using one or more policies to be archived. The archive module can be executing on a server platform 608 or another type of computing device with enough computer power to host the database. The server platform can consist of computer hardware upon which an operating system such as UNIX™, Linux™, Windows™, or another operating system is running. The archive module contains metadata storage which records the implicit application relationships input by the user through 612. The archive module also implements the method described previously and is able to identify the chained archivable data rows between tables using the explicit and implicit application relationship, as described previously. The result is that the chained rows are properly marked as being in the same application partition and are assigned the same unique APID.

An archive database 618 can be configured to receive the identified data rows for archive storage. In addition, the archive database can be hosted on a separate archive database server 620 or alternatively the archive database can be located on the main database server. Also, the archive database can be any type of electronic storage media In other words, it is not essential that the target archive location is a database. There may also be a short term archive and a long term archive depending on the desired accessibility of the data.

In summary, because complicated business application data can be difficult to move, remove clone and archive, the present system and method help speed up such operations. Making these operations more efficient is important because hardware and software maturity life cycles have become increasingly shorter. The challenge for many of these operations is the proper identification of interrelated data on a business level.

The present system and method are able to identify the business level interrelationships and group data into business partitions. The method described herein performs this discovery using set-based SQL operations, as opposed to the more expensive row-by-row tracing of the data rows' interrelations. As a result, the system and method has demonstrated good performance with respect to calculating complete closure operations.

The method described with respect to FIG. 3 and any of the elements related to the system and methods described herein can be embodied in an article of manufacture. The article of manufacture can be a computer usable medium or computer readable medium having computer readable program code embodied therein for collaboration for system development. Examples of computer readable mediums include, but are not limited to, storage and accessing of software instructions from hard disks, tape drives, optical mediums (e.g., CD, DVD, HD-DVD, Blu-Ray), Random Access Memory (RAM), Read Only Memory (ROMs) and other similar electronic storage mediums.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method of obtaining interrelated data for a database, comprising:
    calculating a data row set for a driving table in the database using at least one archive policy;
    obtaining explicit relationships and application relationships implicit between sub-tables and respective parent tables, the application relationships not being explicitly defined by the database and the application relationships being defined by at least one application that operates on the database;
    linking the driving table to the sub-tables to identify eligible rows in the sub-tables;
    copying partition identifiers from driving table rows to the data rows in sub-tables in order to enable merging of application partitions;
    finding additional data rows in the driving table based on the application relationship between the sub-tables and the driving table; and
    driving through the sub-tables and parent tables until no additional rows in the driving table are identified.

2. The method of claim 1, further comprising the step of archiving data collected from the tables.

3. The method of claim 1, wherein the step of obtaining an application relationship further comprises the step of obtaining an implicit application relationship between sub-tables and respective parent tables, which is not defined explicitly in the database, from a system administrator.

4. The method of claim 1, wherein the step of obtaining an application relationship further comprises the step of obtaining an implicit application relationship between sub-tables and respective parent tables from a system administrator through a graphical user interface drawing tool.

5. The method of claim 1, wherein the step of obtaining an application relationship further comprises the step of obtaining an implicit application relationship between sub-tables and respective parent tables table by inspecting business rules programmed for the database.

6. The method of claim 1, wherein the step of obtaining an application relationship further comprises the step of obtaining an implicit application relationship between sub-tables and respective parent tables by automatically inspecting business rules located in a middleware software layer associated with the database.

7. A method as in claim 1, further comprising the step of excluding any data rows that are not eligible to be archived.

8. The method of claim 7, wherein the step of excluding any data rows that are not eligible to be archived further comprises the step of determining whether data rows found are ineligible because the data row fails a rule preventing archiving of the data.

9. The method of claim 8, further comprising the step of determining the eligibility of data found in the second level table.

10. The method of claim 1, wherein the application relationships are not defined by data appearing in either the sub-tables or the parent tables.

11. A method of obtaining interrelated business data for a database on a computer system, comprising:
  calculating a data row set for a driving table in the database using at least one archive policy;
  obtaining explicit and application relationships between a second level table and the driving table, the application relationships not being explicitly defined by the database and the application relationships being defined by at least one application that operates on the database;
  linking the driving table to the second level table to identify data rows eligible for archiving in the second level table;
  copying partition identifiers from driving table rows to the second level table data rows in order to enable merging of application partitions;
  finding additional data rows in the driving table based on the application relationship between the second level table and the driving table; and
  archiving data rows collected from the tables.

12. The method of claim 11, further comprising the step of looping repeatedly through the linking and finding steps until no additional rows are found in the second level table and driving table.

13. The method of claim 11, wherein the step of obtaining an application relationship further comprises the step of obtaining an application relationship between the second level table and the driving table from a system administrator.

14. The method of claim 11, wherein the step of obtaining an application relationship further comprises the step of obtaining an application relationship between the second level table and the driving table from a system administrator through a graphical user interface drawing tool.

15. The method of claim 11, wherein the step of obtaining an implicit application relationship further comprises the step of obtaining an implicit application relationship between the second level table and the driving table by automatically inspecting business rules programmed associated with the database.

16. The method of claim 11, wherein the step of obtaining an application relationship further comprises the step of obtaining an application relationship between the second level table and the driving table by automatically inspecting business rules located in a middleware software layer associated with the database.

17. The method of claim 11, wherein the application relationships are not defined by data appearing in either the driving table or the second level table.

18. A method of obtaining interrelated business data for a database executing on a computer platform, comprising:
  calculating a data row set for a driving table in the database using at least one archive policy;
  obtaining explicit and application relationships between sub-tables and the driving table, wherein the implication application relationships are entered by a system administrator and are not explicitly defined by the database;
  linking the driving table to the sub-tables to identify data rows eligible for archiving in the second level table;
  finding additional data rows from sub-tables joined to the sub-tables;
  determining the eligibility of data found in the driving table and sub-tables;
  copying partition identifiers from driving table rows to the sub-tables data rows in order to enable merging of application partitions;
  finding additional data rows in the driving table based on the application relationship between the sub-tables and the driving table.

19. The method of claim 18, further comprising the step of archiving data rows collected from the tables.

20. The method of claim 18, further comprising the step of finding data rows between each parent table and sub-table and extracting any additional data rows until no additional data rows are found in the driving table.

21. A system for obtaining interrelated business data for a database executing on a computer platform, comprising:
  a plurality of tables in the database, including a driving table and sub-tables, the database having explicit relationships defined between the tables;
  a graphical database interface configured to obtain an implicit application relationship defining implicit relationships between the sub-tables and their respective parent table, the application relationships not being explicitly defined by the database;
  a computer-based archive module configured to calculate a data row set for a driving table in the database using a policy range to be archived and to identify chained archivable data rows between the driving table and sub-tables using the implicit application relationship;
  an archive database configured to receive the identified data rows for archive storage.

22. The system of claim 21, wherein the application relationships are not defined by data appearing in either the sub-tables or the parent table.

23. An article of manufacture including a computer usable medium having non-transitory computer readable program code embodied therein for obtaining interrelated business data for a database on a computer system, comprising computer readable program code capable of performing the operations of:
  calculating a data row set for a driving table in the database using at least one archive policy;
  obtaining explicit and implicit application relationships between a second level table and the driving table, the application relationships not being defined by the database;
  linking the driving table to the second level table to identify data rows eligible for archiving in the second level table;
  copying partition identifiers from driving table rows to the second level table data rows in order to enable merging of application partitions;
  finding additional data rows in the driving table based on the application relationship between the second level table and the driving table; and
  archiving data rows collected from the tables.

* * * * *

UNITED STATES PATENT AND TRADEMARK OFFICE
CERTIFICATE OF CORRECTION

PATENT NO. : 8,032,493 B2
APPLICATION NO. : 12/239034
DATED : October 4, 2011
INVENTOR(S) : Yu Gong Page 1 of 1

It is certified that error appears in the above-identified patent and that said Letters Patent is hereby corrected as shown below:

In column 10, line 56, in Claim 5, after "tables" delete "table".

Signed and Sealed this
Fifteenth Day of May, 2012

David J. Kappos
*Director of the United States Patent and Trademark Office*